United States Patent [19]

Komatsu et al.

[11] Patent Number: 5,034,262

[45] Date of Patent: Jul. 23, 1991

[54] PAINT FILM STRUCTURE FORMED ON ALUMINUM MEMBER OR ALUMINUM ALLOY MEMBER

[75] Inventors: Yasunori Komatsu; Eiji Suzuki; Toshiya Nishino; Hidenori Kanno, all of Saitama; Akio Fujinaka; Kimio Ochiai, both of Shizuoka, all of Japan

[73] Assignees: Honda Giken Kogyo Kabushiki Kaisha, Tokyo; Asahi Katantetsu Kabushiki Kaisha, Shizuoka, both of Japan

[21] Appl. No.: 351,983

[22] Filed: May 15, 1989

[30] Foreign Application Priority Data

May 17, 1988 [JP] Japan ................................ 63-119729

[51] Int. Cl.$^5$ ...................... B32B 7/02; B32B 15/08
[52] U.S. Cl. ...................................... 428/212; 428/213; 428/447; 428/448; 428/450; 428/461
[58] Field of Search ............... 428/447, 412, 212, 213, 428/448, 450; 523/456

[56] References Cited

U.S. PATENT DOCUMENTS

| | | | |
|---|---|---|---|
| 4,315,970 | 2/1982 | McGee | 428/412 |
| 4,847,122 | 7/1989 | Goldberg et al. | 523/456 X |
| 4,895,887 | 1/1990 | Daimon et al. | 428/447 X |

Primary Examiner—Thomas J. Herbert
Attorney, Agent, or Firm—Darby & Darby

[57] ABSTRACT

A paint film structure formed on an aluminum member or aluminum alloy member has a first paint film layer formed on a surface of the aluminum member or aluminum alloy member and a second paint film layer formed on a surface of the first paint film layer, the first and second paint film layers being chiefly composed of a colloidal silica, an organoalkoxysilane part hydrolysis condensation product, and a polymer or copolymer of an unsaturated ethylenic monomer, polymeric content or copolymeric content of the unsaturated ethylenic monomer in the first paint film layer being less than polymeric content or copolymeric content of the unsaturated ethylenic monomer in the second paint film layer.

6 Claims, 1 Drawing Sheet

FIG. 1
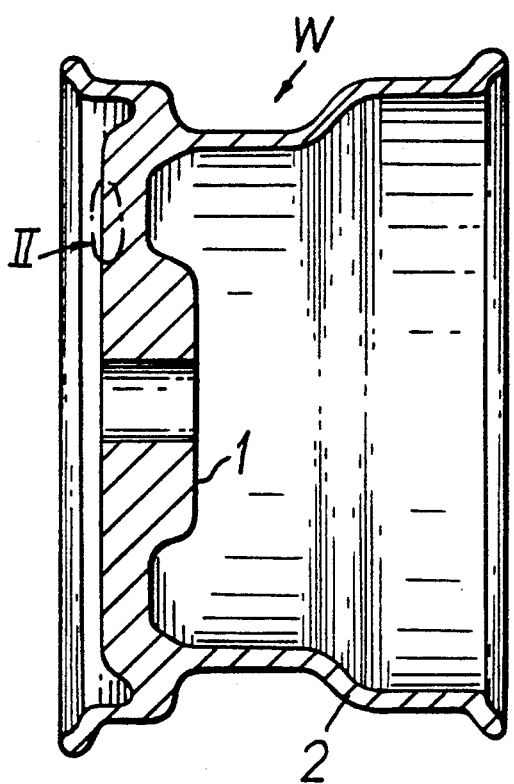
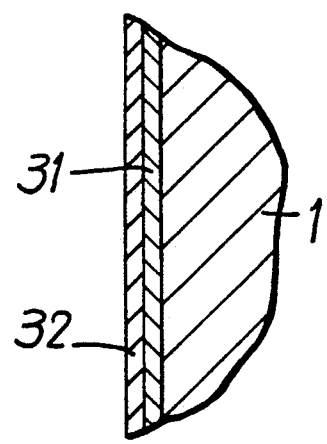
FIG. 2

PAINT FILM STRUCTURE FORMED ON ALUMINUM MEMBER OR ALUMINUM ALLOY MEMBER

BACKGROUND OF THE INVENTION

1. Field of the Invention

This invention relates to a paint film structure formed on the surface of an aluminum member aluminum alloy member such as, for example, an aluminum wheel of automotive vehicles.

2. Brief Description of the Prior Art

Heretofore, an organic substance system paint film has been used as a paint film formed on an aluminum member or aluminum alloy member such as, for example, an aluminum wheel, because the paint film can be made thick and the burning temperature of the coating material is not very high.

However, it has the following disadvantages.

(1) Since the organic substance system paint film has a weak affinity with respect to the surface of a metal, the aluminum member or aluminum alloy member is apt to corrode.

(2) Since the organic substance system paint film has a strong affinity with respect to a stain, it is difficult to clean the stain attached to the surface of the paint film. In addition, since this paint film is readily damaged, the fancy appearance of the aluminum member or aluminum alloy member is spoiled.

On the other hand, an attempt has been made for applying an inorganic substance system paint film on the surface of the aluminum member or aluminum alloy member. However, it also has the following disadvantages.

(1) If the inorganic substance system paint film is made thick, it is easily separated from or swollen out of the surface of the aluminum member of aluminum alloy member.

(2) Since the burning temperature of the coating material is high, the aluminum member or aluminum alloy member is easily changed in quality when burning.

SUMMARY OF THE PRESENT INVENTION

The object of the present invention is to provide a paint film structure formed on an aluminum member or aluminum alloy member which is capable of solving the above-mentioned inconveniences.

In order to achieve the above object, there is essentially provided a paint film structure formed on an aluminum member or aluminum alloy member including a first paint film layer formed on a surface of said aluminum member or aluminum alloy member and a second paint film layer formed on a surface of said first paint film layer, said first and second paint film layers being chiefly composed of a colloidal silica, an organoalkoxysilane part hydrolysis condensation product, and a polymer or a copolymer of an unsaturated ethylenic monomer, polymeric content or copolymeric content of said unsaturated ethylenic monomer in said first paint film layer being less than polymeric content or copolymeric content of said unsaturated ethylenic monomer in said second paint film layer.

Also, the thickness of the paint film of the second paint film layer may be larger than that of the first paint film layer.

Also, the unsaturated ethylenic monomer may include an acrylic derivative, a stylene or a vinyl acetate.

A paint film structure formed on an aluminum member or aluminum alloy member with the above-mentioned construction exhibits the property of the first paint film layer which has a small polymeric or copolymeric content of an unsaturated ethylenic monomer and at the same time, it exhibits the property of the second paint film layer which has a large polymeric or copolymeric content of the unsaturated ethylenic monomer.

For a better understanding of the present invention, together with other and further objects thereof, reference is made to the following description, taken in connection with the accompanying drawings, while its scope will be pointed out in the appended claims.

BRIEF DESCRIPTION OF THE DRAWINGS

FIG. 1 is a sectional view of a paint film structure formed on an aluminum wheel according to one embodiment of the present invention; and FIG. 2 is an enlarged view of a portion represented by II of FIG. 1.

DETAILED DESCRIPTION OF THE EMBODIMENT

One preferred embodiment of the present invention will be described hereunder with reference to the accompanying drawings, wherein the present invention is applied to a wheel for use in automotive vehicles.

In FIG. 1, 1 denotes a disk of a wheel W for use in automotive vehicles, and 2 denotes a rim which is integrally formed on the external periphery of the disk 1. The disk 1 and the rim 2 are integrally cast of an aluminum alloy member.

In FIG. 2, 31 denotes a first paint film layer which is applied to the surface of the disk 1. This first paint film layer 31 chiefly composed of a colloidal silica, an organoalkoxysilane part hydrolysis condensation product, and a polymer or a copolymer of an unsaturated ethylenic monomer. As one example of the colloidal silica and the organoalkoxysilane part hydrolysis condensation product, there can be listed compositions which are obtained by hydrolyzed the organoalkoxysilane in the colloidal silica. Similarly, as one example of the unsaturated ethylenic monomer, there can be listed an acrylic derivative, a stylene, a vinyl acetate or the like. The polymeric content or the copolymeric content of the unsaturated ethylenic monomer is $1 \sim 15$ wt. %, and the thickness of the paint film thereof is $2 \sim 10$ μm.

Also, 32 denotes a second paint film layer which is applied to the surface of the first paint film layer 31. The chief compositions of the second paint film layer 32 are the same to those of the first paint film layer 31, i.e., a colloidal silica, an organoalkoxysilane part hydrolysis condensation product, and a polymer or a copolymer of an unsaturated ethylenic monomer. However, the polymeric content or the copolymeric content of the unsaturated ethylenic monomer is $3 \sim 50$ wt. % which is larger than that of the first paint film layer 31. Also, the thickness of the paint film is 3-60 μm which is thicker than the first paint film layer 31. The first paint film layer 31 and the second paint film layer 32 are formed by applying coating materials of corresponding compositions onto the disk 2. In this case, the burning temperature is preferably 100° C. $\sim$ 200° C.

As apparent from the foregoing description, since a paint film structure formed on an aluminum member or aluminum alloy member of the present invention includes a first paint film layer formed on a surface of said aluminum member or aluminum alloy member and a second paint film layer formed on a surface of said first paint film layer, said first and second paint film layers being chiefly composed of a colloidal silica, an organoalkoxysilane part hydrolysis condensation product, and a polymer or a copolymer of an unsaturated ethylenic monomer, polymeric content or copolymeric content of said unsaturated ethylenic monomer in said first paint film layer being less than polymeric content or copolymeric content of said unsaturated ethylenic monomer in said second paint film layer. Accordingly, it exhibits the property of the first paint film layer which has a small polymeric or copolymeric content of an unsaturated ethylenic monomer and at the same time, it exhibits the property of the second paint film layer which has a large polymeric or copolymeric content of the unsaturated ethylenic monomer.

Therefore, the paint film structure formed on this aluminum wheel, as is apparent from Table 1, has the following advantages.

(1) Since the affinity between the first paint film layer and the surface of the metal is strong, the aluminum wheel is not easily rusted.

(2) Since the affinity between the second paint film layer and the stain is weak, the stain attached to the surface of the paint film can be cleaned with easy and therefore, the fancy appearance of the aluminum wheel can be maintained. Also, since it is hard, it is hardly susceptible to damage.

(3) The paint film can be made thick.

(4) Since the coating material can be baked at a low temperature, the aluminum wheel is difficult to be changed in quality when baking.

(5) Since a yarn-like rust can be prevented from occuring to the surface of the aluminum wheel, the fancy appearance of the aluminum wheel can be maintained for a long period of time.

of automotive vehicles and an acceleration-brake was repeated to observe the attachment of the wear powders to the brake pad.

(6) The thermal test was carried out in such a manner as that a metallic member with a test coating material applied thereto was heated to 160° C. and then cooled by water, and this procedure was repeated 10 times to observe the change on the surface of the metallic member where the coating material was applied.

(7) The marks in the Table mean as follows:
: excellent◯: good, Δ: fair, X: poor (8) The term "yarn-like rust" means a rust having a zigzag shape like a flash of lightning.

What is claimed is:

1. A paint film structure formed on an aluminum member or aluminum alloy member including a first paint film layer formed on a surface of said aluminum member or aluminum alloy member and a second paint film layer formed on a surface of said first paint film layer;

said first and second paint film layers being chiefly composed of a colloidal silica, an organoalkoxysilane part hydrolysis condensation product, and a polymer or a copolymer of an unsaturated ethylenic monomer;

polymeric content or copolymeric content of said unsaturated ethylenic monomer in said first paint film layer being less than polymeric content or copolymeric content of said unsaturated ethylenic monomer in said second paint film layer.

2. A paint film structure formed on an aluminum member or aluminum alloy member as claimed in claim 1, wherein said unsaturated ethylenic monomer includes an acrylic derivative, a styrene or a vinyl acetate.

3. A paint film structure formed on an aluminum or aluminum alloy member as claimed in claim 1, wherein

TABLE 1

| | CASS test | Yarn-like rust | Oil stain | Thermal resistance | Hardness | Brake test | Thermal cycle test |
|---|---|---|---|---|---|---|---|
| Paint film structure formed on organic substance system | ◯ | X | X | X | B ~ 2H | X | Δ |
| Paint film structure formed on inorganic substance system | X | ◯ | | | 8 ~ 9H | | Crack |
| Paint film structure of this invention | ◯ | ◯ | ◯ | ◯ | 6 ~ 7H | | |

(1) An acrylic system coating material was used as an organic substance system coating material.

(2) An inorganic 100% coating material chiefly composed of a siloxane bond was used as an inorganic system coating material.

(3) The CASS test was carried out according to JIS.

(4) The yarn-like rust test was carried out with respect to an aluminum alloy member. This yarn-like rust test was carried out in such a manner as that a scratch is put into a test piece, a salt spray test was carried out for it for 120 hours, then the resultant was left in atmosphere for 240 hours, and the length of a yarn-like rust generated from a scratch mark was checked.

(5) The brake test was carried out in such a manner as that a test coating material was applied to the wheel said aluminum member or aluminum alloy member is a vehicle wheel.

4. A paint film structure formed on an aluminum member or aluminum alloy member as claimed in claim 1, wherein the paint film thickness of said second paint film layer is larger than that of said first paint film layer.

5. A paint film structure formed on an aluminum member or aluminum alloy member as claimed in claim 4, wherein said unsaturated ethylenic monomer includes an acrylic derivative, a styrene or a vinyl acetate.

6. A paint film structure formed on an aluminum or aluminum alloy member as claimed in claim 4, wherein said aluminum member or aluminum alloy member is a vehicle wheel.

* * * * *